(12) United States Patent
Kuroda et al.

(10) Patent No.: US 6,310,847 B2
(45) Date of Patent: Oct. 30, 2001

(54) OPTICAL DISC, AND READING SYSTEM AND MANUFACTURING METHOD OF THE DISC

(75) Inventors: Kazuo Kuroda; Toshio Suzuki; Eiji Muramatsu, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/730,507

(22) Filed: Dec. 15, 2000

Related U.S. Application Data

(62) Division of application No. 08/668,334, filed on Jun. 25, 1996, now Pat. No. 6,181,657.

(30) Foreign Application Priority Data

Jun. 26, 1995 (JP) .................................................. 7-159645

(51) Int. Cl.[7] ...................................................... G11B 7/00
(52) U.S. Cl. ................................ 369/53.33; 369/47.21
(58) Field of Search ........................... 369/53.33, 47.21, 369/47.22, 44.41, 44.28, 44.34, 44.35

(56) References Cited

U.S. PATENT DOCUMENTS

| | | | |
|---|---|---|---|
| 4,654,838 | 3/1987 | Sugiki | 369/44.42 |
| 5,060,208 | * 10/1991 | Nagai et al. | 369/13 |
| 5,060,216 | 10/1991 | Suzuki et al. | 369/44.41 |
| 5,185,730 | 2/1993 | Komaki et al. | 369/275.2 |
| 5,268,887 | 12/1993 | Honguh et al. | 369/44.26 |
| 5,383,176 | 1/1995 | Inui et al. | 369/275.1 |
| 5,448,048 | 9/1995 | Oshiba | 369/44.26 |
| 5,477,523 | 12/1995 | Inoue | 369/275.1 |
| 5,493,552 | 2/1996 | Kobori | 369/275.1 |
| 5,493,561 | 2/1996 | Nishiuchi et al. | 369/275.4 |
| 5,502,708 | 3/1996 | Morimoto | 369/44.41 |
| 5,517,485 | 5/1996 | Nishiuchi et al. | 369/275.3 |
| 5,602,824 | 2/1997 | Ooki et al. | 369/275.1 |

FOREIGN PATENT DOCUMENTS

| | | |
|---|---|---|
| 0 164 131 A2 | 12/1985 | (EP) . |
| 0 294 241 A2 | 12/1988 | (EP) . |
| 0 582 059 | 2/1993 | (EP) . |
| 0 570 235 A2 | 11/1993 | (EP) . |
| 0 656 625 A1 | 6/1995 | (EP) . |

* cited by examiner

*Primary Examiner*—Nabil Hindi
(74) *Attorney, Agent, or Firm*—Arent Fox Kintner Plotkin & Kahn PLLC

(57) ABSTRACT

A writable optical disc has an information writing track, and a guiding track for introducing a laser beam to the information writing track. The guiding track has prepit information recorded thereon, the prepit information including at least address information of the optical disc. The prepit information is recorded on the guiding track at a position where interference of adjacent guiding tracks with the prepit information is prevented. The information writing track is a groove track, and the guiding track is a land track.

4 Claims, 13 Drawing Sheets

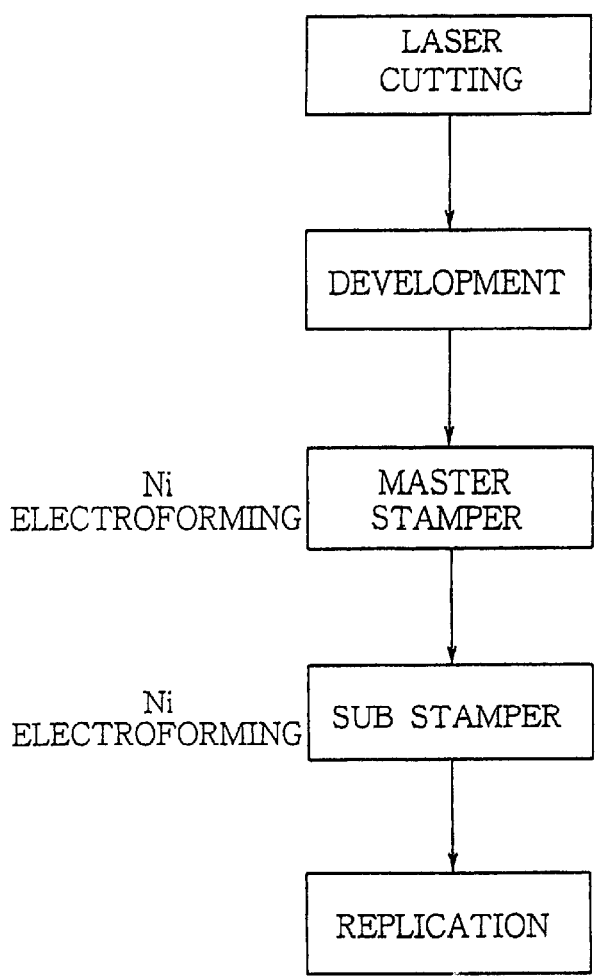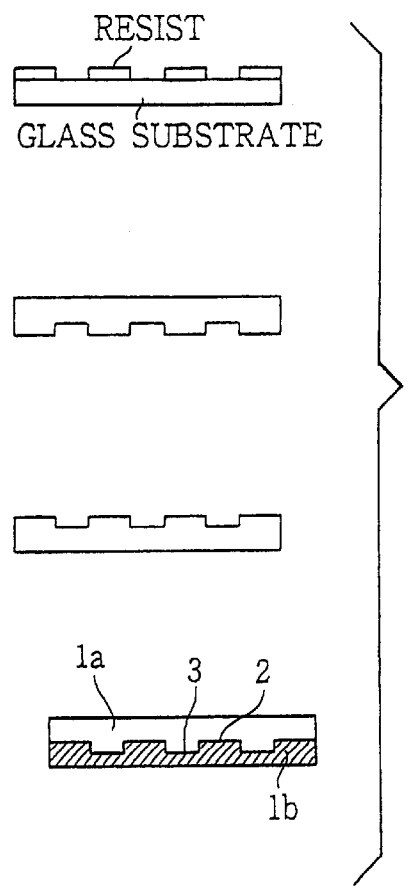

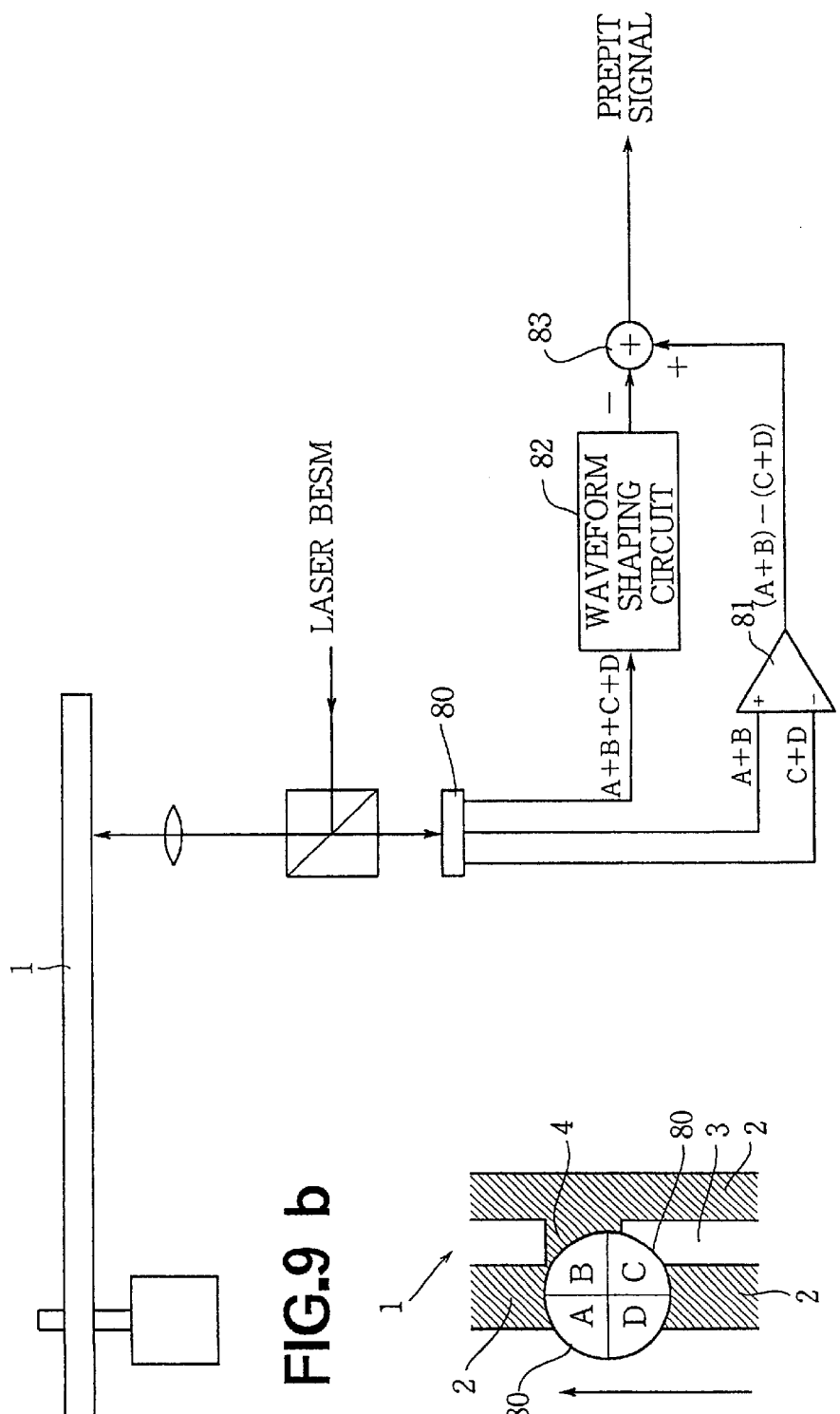

OPTICAL DISC, AND READING SYSTEM AND MANUFACTURING METHOD OF THE DISC

This is a division of application Ser. No. 08/668,334 filed Jun. 25, 1996 now U.S. Pat. No. 6,181,657. The disclosure of the prior application(s) is hereby incorporated by reference herein in its entirety.

BACKGROUND OF THE INVENTION

The present invention relates to a writable optical disc, and a reading system and a manufacturing method of the disc.

In a writable optical disc, information such as a synchronizing signal and address information (hereinafter called prepit information) for searching a position on the disc are previously recorded by laser cutting at a preformat stage in a manufacturing process. As one of methods of the preformat of the prepit information, a track (groove or land) on which information is written by a user is wobbled. In another method, prepits are recorded on the track.

However, in the former method, the track itself is wobbled in a waveform in right and left by a wobbling signal. Therefore, the magnitude of the modulation by the wobbling signal is limited to a small degree. As a result, the C/N decreases. Furthermore, since the interference of the adjacent tracks at the wobbling must be considered, pitch between the tracks can not be reduced. Consequently, the writing capacity of the disc is limited.

In the latter method, since the prepits are recorded, the space for writing the information is reduced. Therefore, the available efficiency of the disc is low.

SUMMARY OF THE INVENTION

An object of the present invention is to provide a writable disc in which the writing capacity of the disc is increased.

Another object of the present invention is to provide a reading system of the disc which can be effectively read out written information.

A further object of the present invention is to provide a manufacturing method of the disc where the disc is efficiently manufactured.

According to the present invention, there is provided a writable optical disc having an information writing track, and a guiding track for introducing a laser beam to the information writing track, characterized in that the guiding track has prepit information recorded thereon, the prepit information including at least address information of the optical disc.

The prepit information is recorded on the guiding track at a position where interference of adjacent guiding tracks with the prepit information is prevented. The information writing track is a groove track, and the guiding track is a land track.

In accordance with the present invention, a reading system for reading a writable optical disc having an information writing track, and a guiding track for introducing a laser beam to the information writing track is further provided. The reading system comprises a photodetector having two photodetecting elements divided by a first line optically parallel with a radial direction of the disc for detecting reflected light of a laser beam reflected from the information writing track, and prepit information extracting means for extracting prepit information recorded on the guiding track based on a difference signal between outputs of the divided two photodetecting elements.

The photodetector is further divided by a second line optically parallel with a tangential direction of the information writing track of the optical disc, and the difference signal is obtained from an output of a pair of photodetecting elements positioned on an inside portion of the second line and an output of a pair of photodetecting elements positioned on an outside portion of the second line for producing a tracking error signal.

Another reading system for reading a writable optical disc having an information writing track, and a guiding track for introducing a laser beam to the information writing track comprises a first photodetector having two photodetecting elements divided by a first line optically parallel with a tangential direction of the information writing track of the disc for detecting reflected light of a first laser beam reflected from the information writing track, a second photodetector having four photodetecting elements divided by a second line optically parallel with the tangential direction of the information writing track of the disc, and divided by a third line optically parallel with a radial direction of the disc for detecting reflected light of a second laser beam reflected from the guiding track, first difference signal producing means for producing a first difference signal based on a difference between outputs of the divided two photodetecting elements of the first photodetector, second difference signal producing means for producing a second difference signal based on a difference between outputs of a pair of photodetecting elements positioned at an inside portion and at an outside portion of the second line of the second photodetector, third difference signal producing means for producing a third difference signal based on a difference between outputs of a pair of photodetecting elements positioned on a portion at a reading forward direction side and at a reverse direction side to the reading forward direction of the third line of the second photodetector, tracking error producing means for producing a tracking error signal based on the first difference signal and the second difference signal, and prepit information extracting means for extracting prepit information on the guiding track based on the third difference signal.

The present invention provide a reading system for reading a writable optical disc having an information writing track, and a guiding track for introducing a laser beam to the information writing track wherein noises included in the prepit information is removed. The reading system comprises a photodetector having two photodetecting elements divided by a line optically parallel with a radial direction of the disc for detecting reflected light of a laser beam reflected from the information writing track, prepit signal producing means for producing a difference signal as a first prepit signal, from outputs of the divided photodetecting elements, added signal producing means for producing an added signal of outputs of the divided photodetecting elements, noise cancel signal producing means for producing a noise cancel signal based on the added signal, and noise extracting means for subtracting the noise cancel signal from the first prepit signal to produce a second prepit signal without noises caused by the added signal.

Another reading system for reading a writable optical disc having an information writing track, and a guiding track for introducing a laser beam to the information writing track comprises a photodetector having two photodetecting elements divided by a line optically parallel with a radial direction of the disc for detecting reflected light of a laser beam reflected from the information writing track, prepit signal producing means for producing a difference signal as a first prepit signal, from outputs of the divided photodetecting elements, noise cancel signal producing means for producing a noise cancel signal based on a laser beam for writing information on the information writing track, and noise extracting means for subtracting the noise cancel signal from the first prepit signal to produce a second prepit signal without noises caused by the writing laser beam.

There is further provided a method for manufacturing a writable optical disc having an information writing groove, a guiding land, and prepit information recorded on the land, the method comprising steps of performing a laser cutting to expose a resist coated on an original glass substrate by a laser beam modulated based on prepit information to be recorded on a land, developing the exposed resist, thereby forming a land and prepits on the land, performing electroforming to the developed glass substrate for producing a master stamper, performing electroforming to the master stamper for producing a sub stamper, and replicating an optical disc by using the sub stamper.

These and other objects and features of the present invention will become more apparent from the following detailed description with reference to the accompanying drawings.

BRIEF DESCRIPTION OF DRAWINGS

FIG. 3 is a diagram showing a manufacturing process of the disc;

FIGS. 9a and 9b are diagrams showing a reading system of a third embodiment of the present invention;

DETAILED DESCRIPTION OF THE PREFERRED EMBODIMENTS

Figure 1:
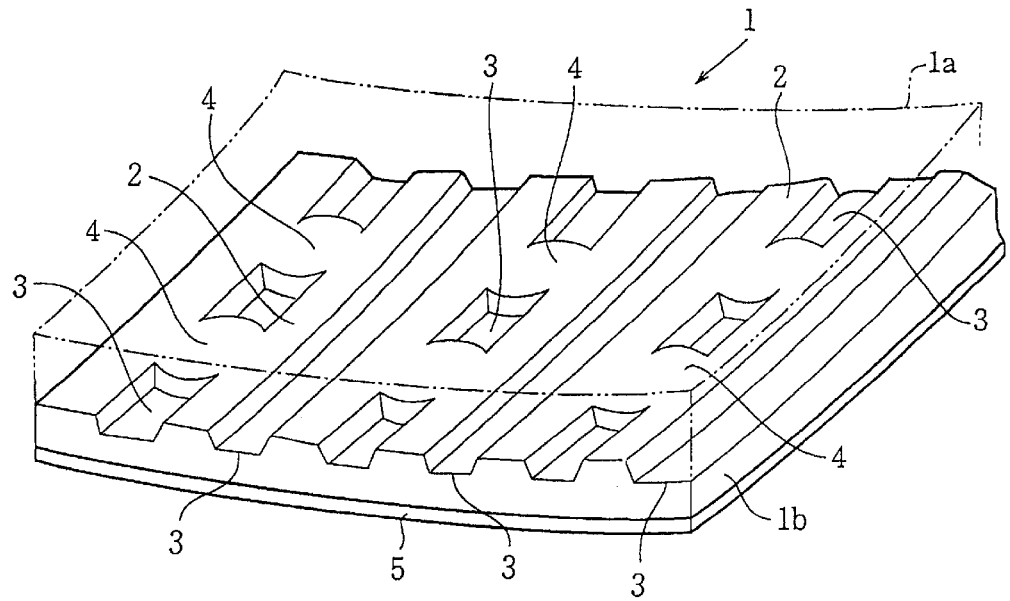
FIG. 1 is an enlarged perspective view partly showing an optical disc of the present invention.

Referring to FIG. 1 typically showing a writable optical disc of the present invention, an optical disc 1 comprises a transparent layer 1a made of transparent resin such as polycarbonate, a coloring matter 1b under the transparent layer 1a, and a metallic reflection film 5. On the underside of the transparent layer 1a, a plurality of grooves 2 (as viewed from the reflection film 5) as information writing tracks, and a land 3 as a guiding track are spirally formed from a central portion of the disc to an outer periphery thereof. Prepits 4 are recorded on the land 3 as the guiding track for prepit information by the preformat. The metallic reflection film 5 is coated on the coloring matter 1b. A protection film (not shown) is layered on the reflection film 5. In FIG. 1, a laser beam is projected from a portion above the disc 1 to the groove 2 and the land 3.

Figure 2:
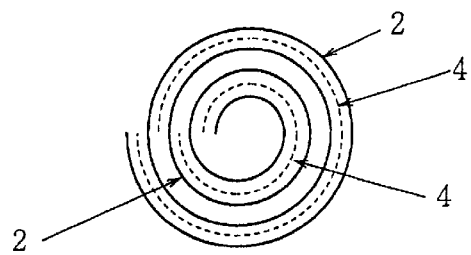
FIGS. 2a and 2b are schematic diagrams showing examples of prepits formed on the disc.
Figure 2:
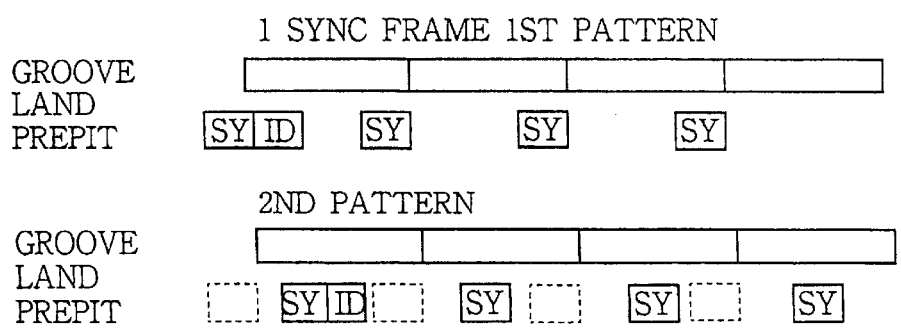

FIG. 2a shows the track of the disc 1 which is spirally formed thereon. The prepits 4 are recorded on every other land 3 for preventing the prepit information from interfering. When writing or reproducing the information by a pickup, if the prepits 4 are recorded on each of the lands 3, the pickup may read information of prepits 4 recorded on adjacent lands which are disposed opposite sides of the groove 2 at the same time. Accordingly, the prepit information can not be ensurely reproduced.

FIG. 2b show another example tracks for preventing the interference of the information. A recording pattern comprising a first pattern and a second pattern is provided for recording the prepit information on the land. Each of the first and second patterns has sync Sy (at every SYNC frame) and ID information necessary for servo. The sync Sy and ID information recorded by the first pattern are deflected with a predetermined phase difference, for example, with 180 phase difference from the sync Sy and ID information recorded by the second pattern.

The prepit information is first recorded in the spiral direction by the first pattern. If the sync Sy and the ID of the adjacent lands are almost overlapped, the first pattern is changed to the second pattern to continue recording. Then, if the sync Sy and the ID of the adjacent lands of the second pattern are almost overlapped, the first pattern is used again.

FIG. 3 shows the manufacturing process of the disc.

In a conventional disc, a prepit is recorded on a groove. In cutting of an original glass substrate, a groove is formed by laser cutting. If the conventional disc is employed for the present invention, the prepit is cut on a land after the groove is cut. Accordingly, the number of processes increases, and it is difficult to precisely cut the prepit.

In the present invention, when a laser cutting is performed, a resist coated on an original glass substrate is exposed by laser cutting and developed based on the prepit information, thereby forming lands and recording prepits on the lands at the same time. Thus, a master stamper is made. The master stamper is processed by electroforming to form a sub master, or the sub master is further processed by electroforming at even times to form a sub stamper. After the electroforming, a replication is made to the transparent layer 1a. Thereafter, the coloring matter 1b is formed on the underside of the layer 1a.

In the process, since the substrate is cut by only one cutting process, the prepit is not deflected from the land. Thus, a disc having high accuracy can be manufactured.

Figure 4:
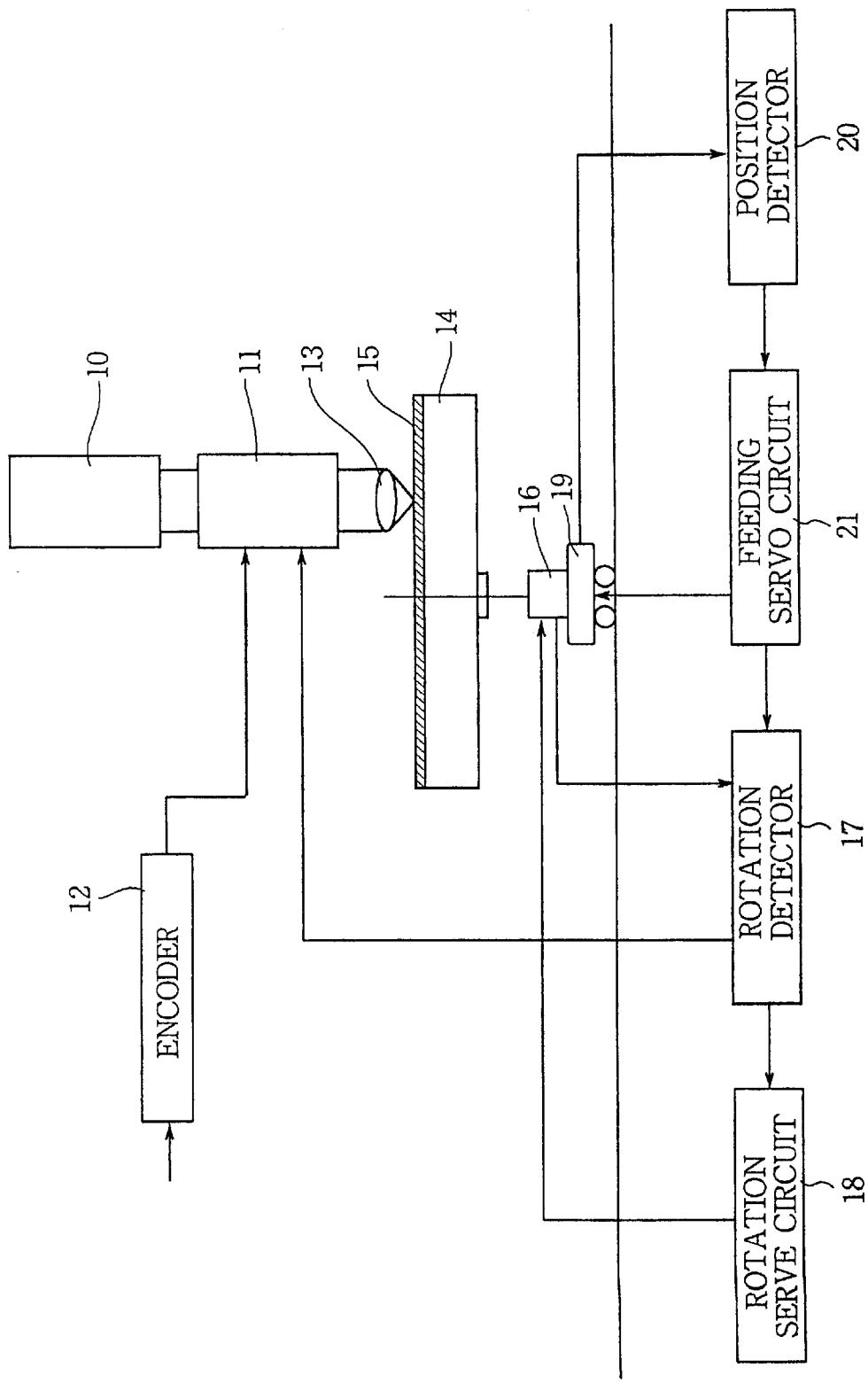
FIG. 4 is a diagram showing a cutting machine of the disc using a laser beam.

FIG. 4 shows a cutting machine employed with the laser cutting. The cutting machine comprises a laser 10 for emitting a laser beam having a large power. An optical modulator 11 is provided for modulating the laser beam from the laser 10 in accordance with land cutting information applied from an encoder 12. A glass substrate 14 having a resist 15 coated thereon is mounted on a spindle motor 16. The laser beam modulated by the modulator 11 is focused on the resist 15 by an objective lens 13 for forming a spot thereon.

The spindle motor 16 is rotated by a rotation detector 17 and a rotation servo circuit 18 at a constant linear velocity (CLV). The motor 16 is mounted on a feeding unit 19 to be moved in a radial direction of the glass substrate 14 by a position detector 20 and a feeding servo circuit 21 at a predetermined speed. Thus, the lands and prepits are cut on resist 15 of the substrate 14 in a spiral direction from a central portion of the substrate to an outer periphery thereof.

Figure 5:
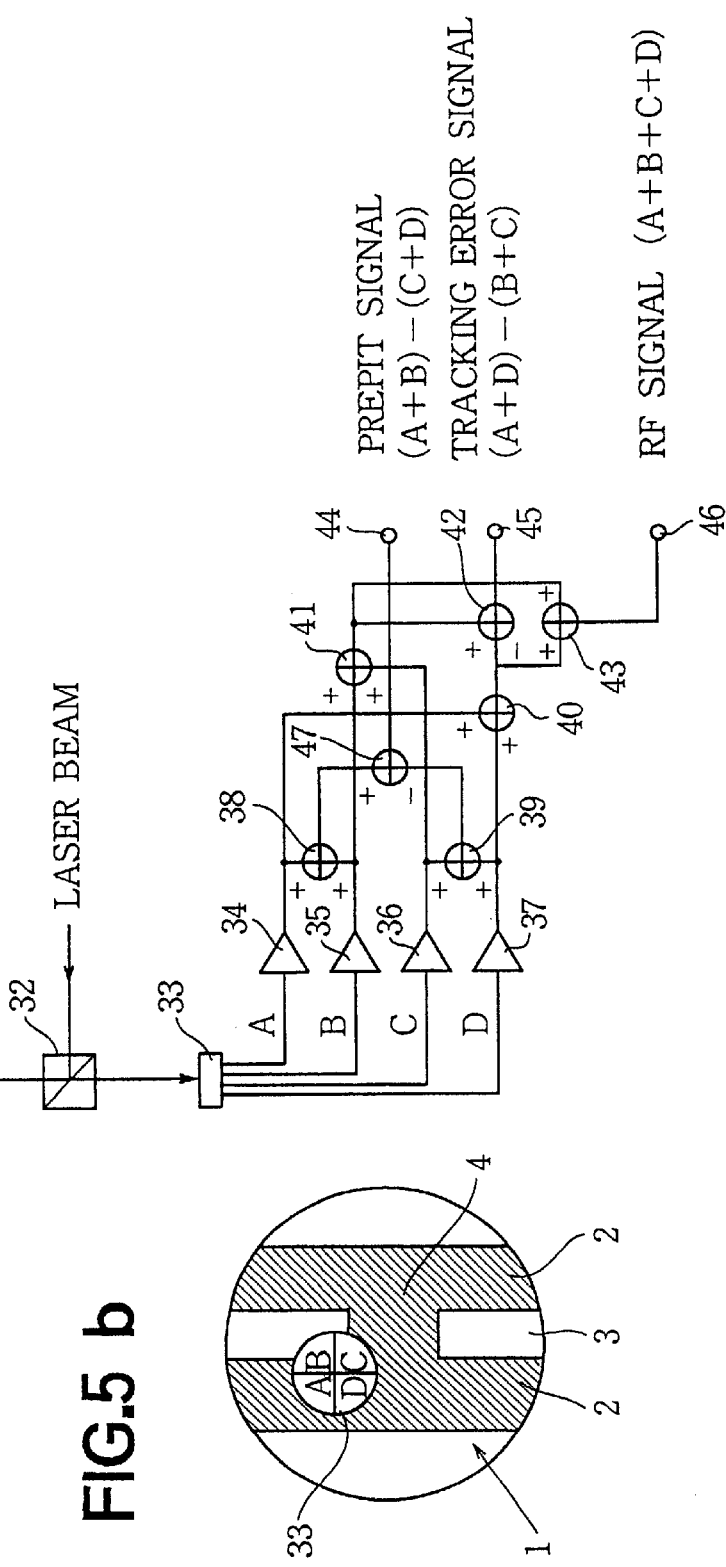
FIGS. 5a and 5b are diagrams showing a reading system to which the present invention is applied.
Figure 5:
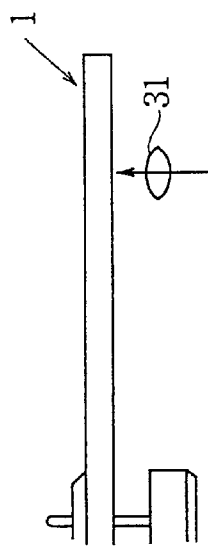

FIGS. 5a and 5b show an embodiment of a reading system for reading information written on the disc.

A laser beam for reproducing information is reflected from a prism 32 and projected on a recording surface of the disc 1 through an objective lens 31 to form a spot of the laser beam. The light reflected from the disc 1 is fed to a photodetector 33 through the prism 32.

FIG. 5b shows the spot of the laser beam on the disc 1. The spot is formed on the groove 2 near the land 3. The photodetector 33 comprises four photodetecting elements A, B, C and D divided by a line parallel with the radius of the disc and a line parallel with the tangential direction of the groove 2 as the information recording track.

The divided four elements A to D produce corresponding output signals A to D which are applied to amplifiers 34 to 37, respectively. A plurality of adders and subtracters 38 to 43 and 47 are provided for adding and subtracting amplified signals from the amplifiers. Thus, an RF signal, a tracking error signal, and prepit information recorded on the land are read out.

In order to read the information written on the groove 2, all of the outputs A to D are added.

In order to obtain the RF signal, the outputs A and D are added by the adder 40, and the outputs B and C are added by the adder 41. Outputs (A+D) and (B+C) are added by the adder 43. Thus, the RF signal (A+B+C+D) is produced from a terminal 46.

The tracking error signal is obtained by a difference between the outputs (A+D) and (B+C) divided in the tracking direction of the groove 2. In this state, the difference of a primary light, not a zero level light, is obtained. The output (A+D) of the adder 40 and the output (B+C) of the adder 41 are subtracted by the subtracter 42. Thus, the tracking error signal (A+D)−(B+C) is produced from a terminal 45.

The prepit information signal (hereinafter called prepit signal) is obtained by a difference between outputs (A+B) and (C+D) divided in the radial direction of the disc. In this state, the difference of a primary light, not a zero level light, is obtained. The outputs A and B are added by the adder 38, and the outputs C and D are added by the adder 39. The output (A+B) of the adder 38 and the output (C+D) of the adder 39 are subtracted by the subtracter 47. Thus, the prepit signal (A+B)−(C+D) is produced from a terminal 44.

As shown in FIG. 2a, when the disc makes one turn, one tracking finishes, the position of the lands 3 changes from the left (right) to the right (left) of the groove 2. However, the change of the position can be easily detected because polarity of the prepit signal (A+B)−(C+D) produced from the terminal 44 is inverted.

Figure 6:
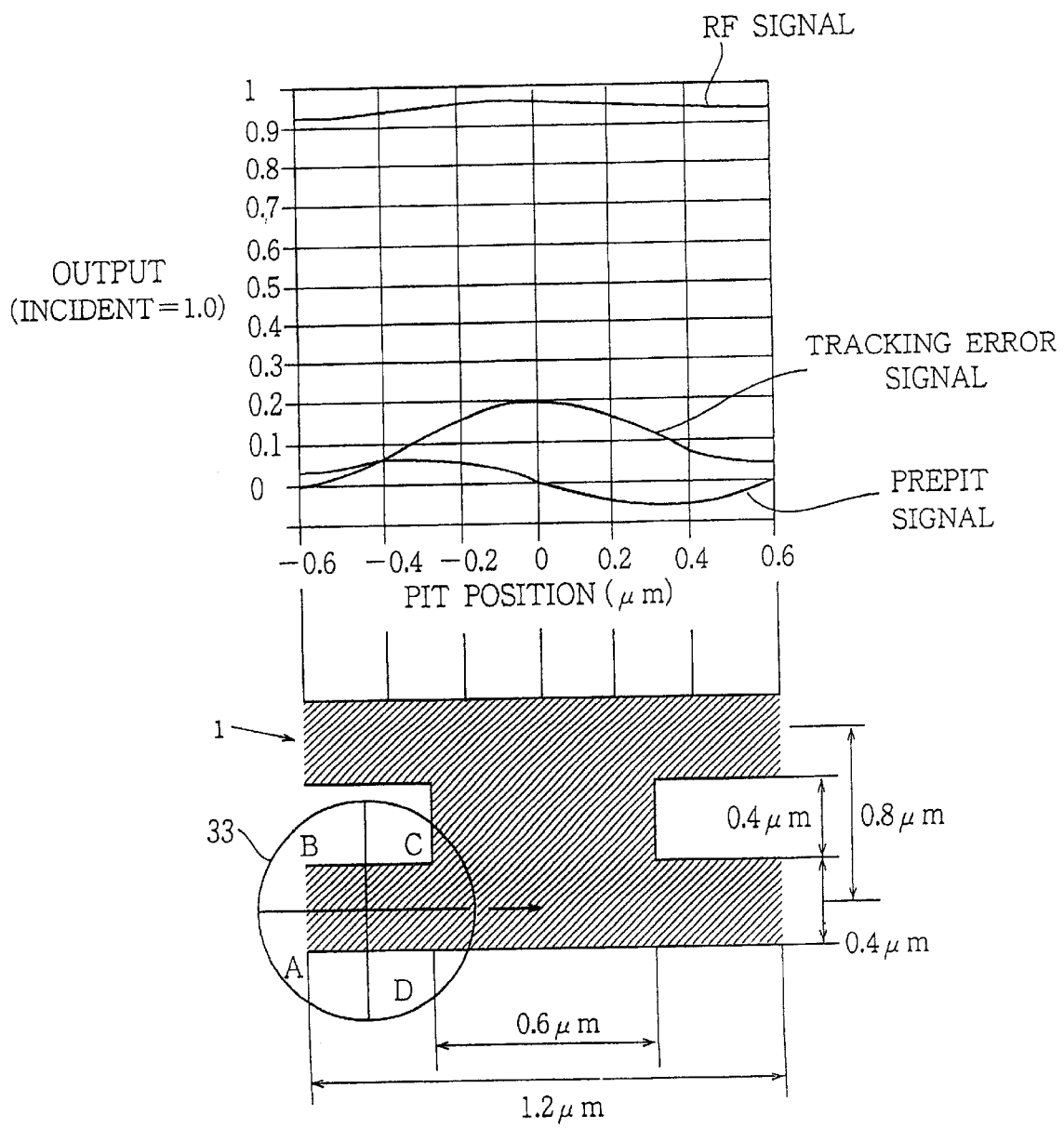
FIG. 6 is a diagram showing signals read out by the reading system with respect to the conditions of the disc.

FIG. 6 shows RF, tracking error and prepit signals read out by the reading system with respect to the conditions of the disc.

Figure 7:
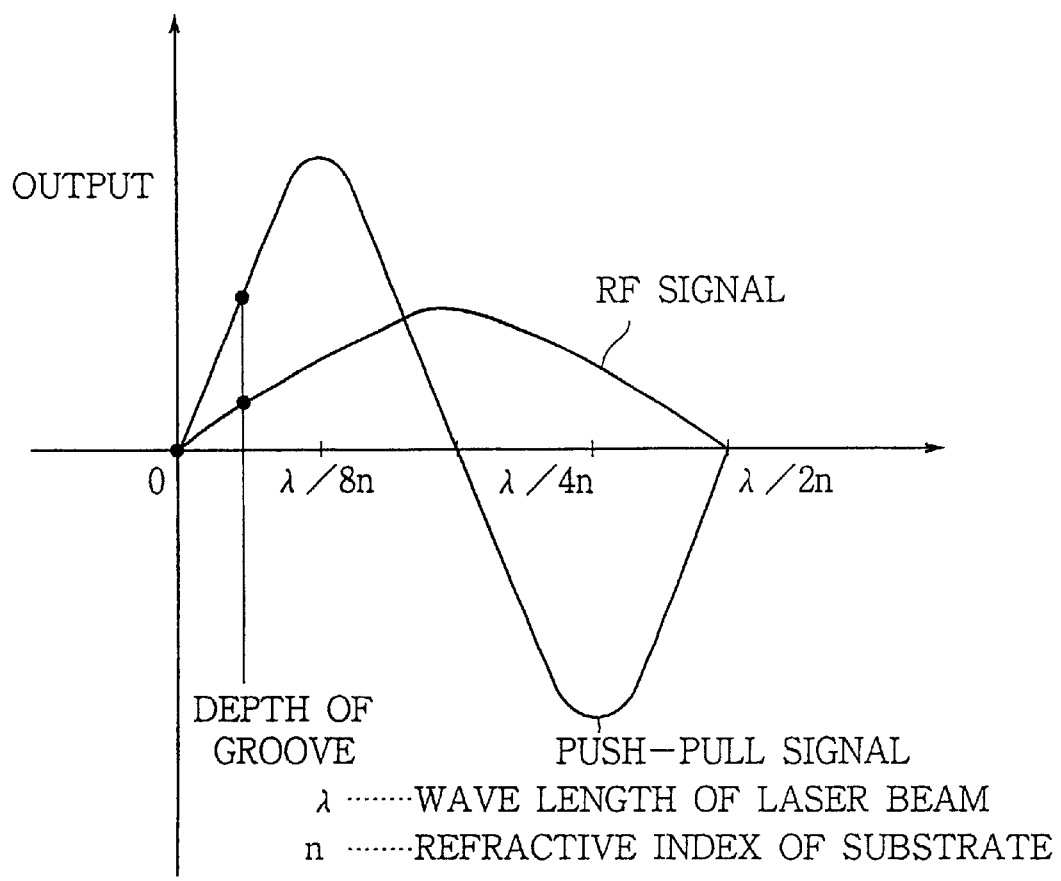
FIG. 7 is a diagram showing output characteristics of a push-pull signal and an RF signal with respect to depth of a groove.

From the foregoing, it will be seen that signals are sufficiently and exactly read out. The prepit signal does not affect the RF signal, because the depth of the groove of the track is determined as shown in FIG. 7.

Figure 8:
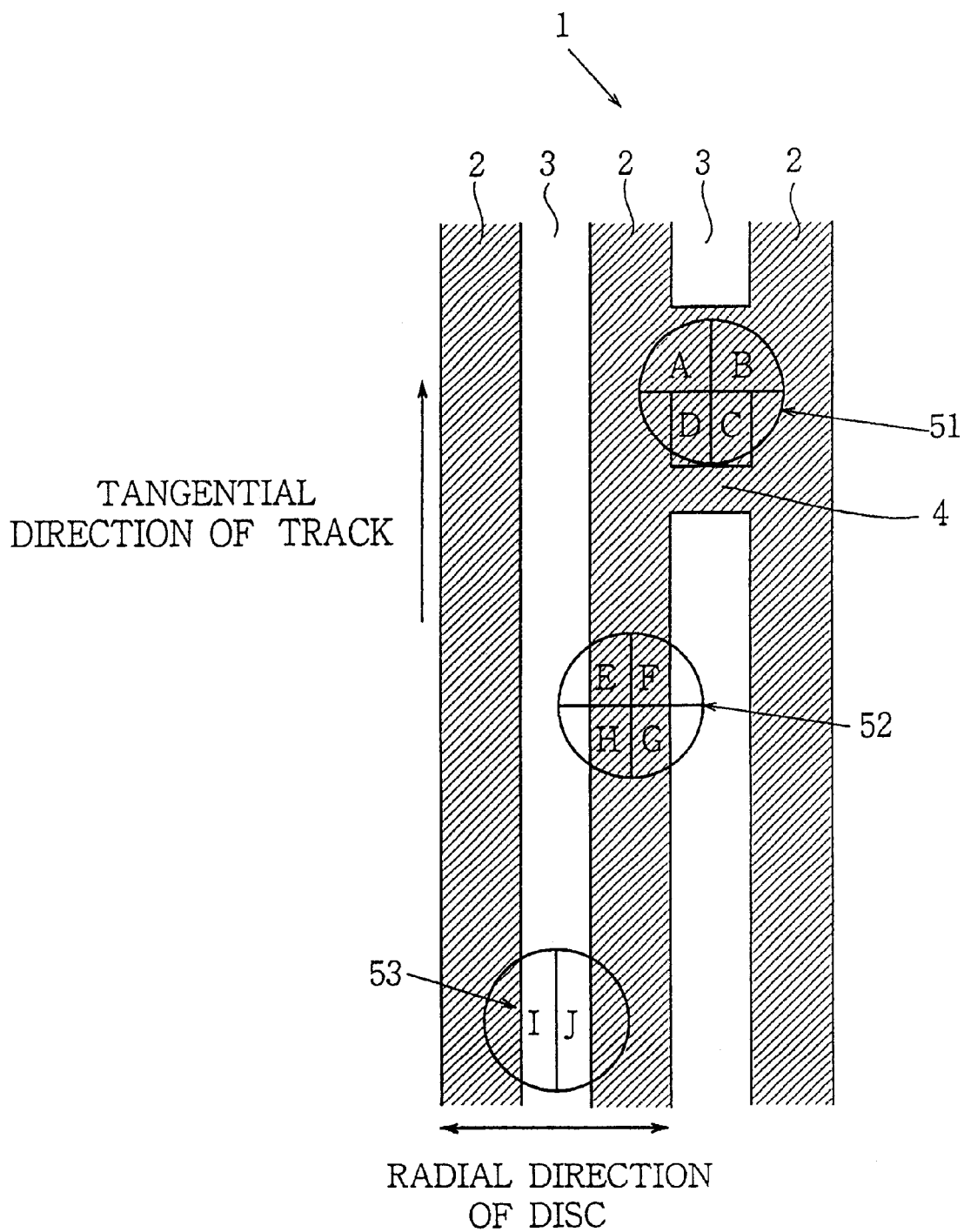
FIGS. 8a and 8b are diagrams showing a reading system of a second embodiment of the present invention.
Figure 8B:
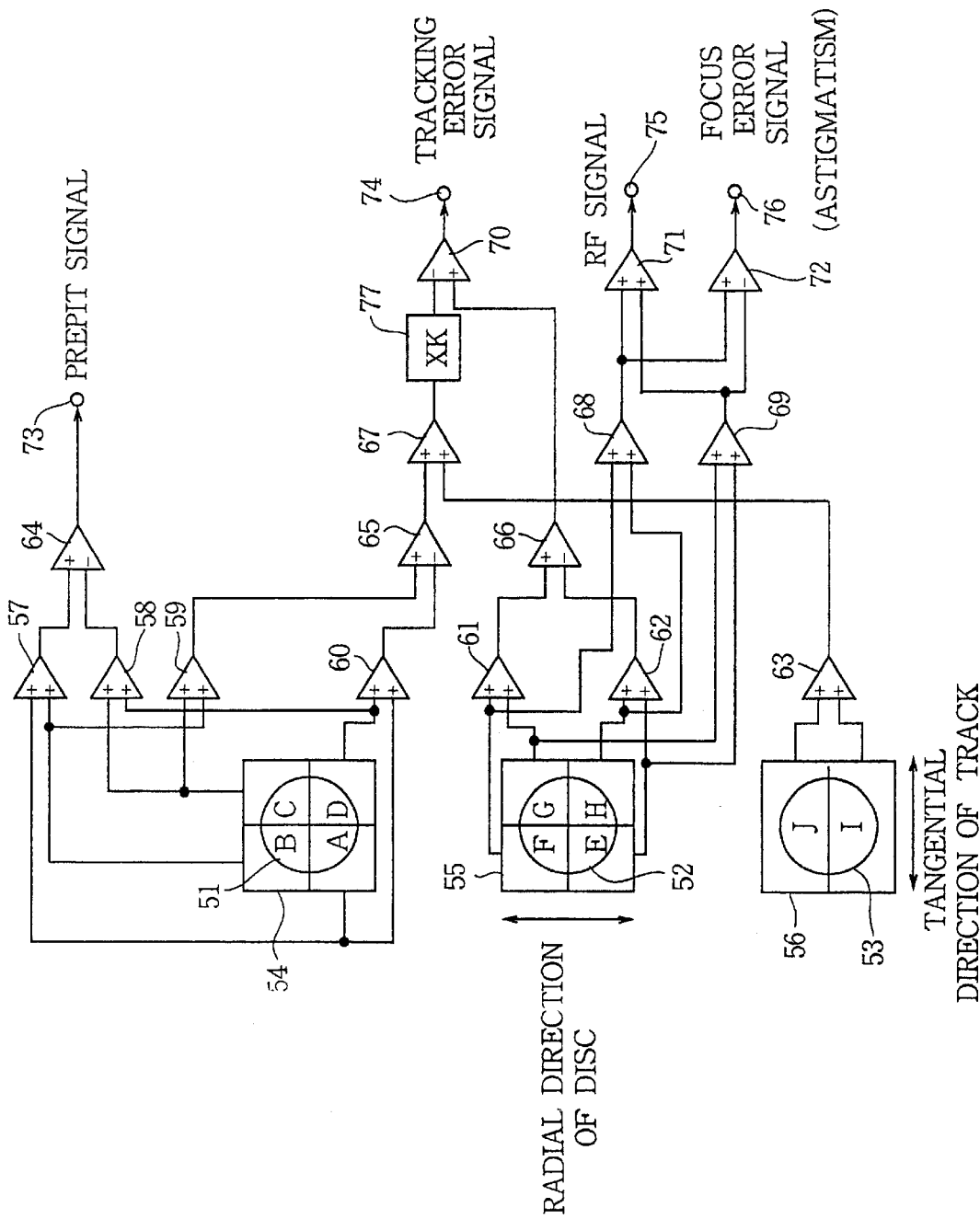

FIGS. 8a and 8b show a second embodiment of the reading system employed with a three spot method.

As shown in FIG. 8a, three laser beams are projected on the disc 1 to form three spots 51, 52 and 53. The spot 51 is projected on the prepit 4 on the land 3. The spot 52 is projected on the groove 2. The spot 53 is projected on the land 3 without the prepit 4.

As shown in FIG. 8b, the reading system has three photodetectors 54, 55 and 56 for detecting the respective spots 51, 52 and 53. The photodetector 54 is divided into four photodetecting elements A, B, C and D in the same manner as the embodiment of FIG. 5a. The photodetector 55 is divided into four photodetecting elements E, F, G and H. The photodetector 56 is divided into two photodetecting elements I and J by a line parallel with the tangential direction of the groove 2. The reading system further has a plurality of adders and subtracters 57 to 72, and a coefficient multiplier 77.

In order to obtain the RF signal, outputs F and H of the photodetector 55 are added by the adder 68, and outputs E and G are added by the adder 69. The outputs (F+H) and (E+G) are added by the adder 71. Thus, the RF signal (E+F+G+H) is produced from a terminal 75.

In order to obtain a focus error signal, a focus error is detected by an astigmatism method using a cylindrical lens (not shown). The output (F+H) of the adder 68 and the output (E+G) of the adder 69 are subtracted by the subtracter 72. Thus, the focus error signal (F+H)−(E+G) is produced from a terminal 76.

In order to obtain the prepit signal, the output (A+B) added by the adder 57 and the output (C+D) added by the adder 58 are subtracted by the subtracter 64. Thus, the prepit signal (A+B)−(C+D) is produced from a terminal 73.

Describing the tracking error signal, the outputs F and G of the photodetector 55 are added by the adder 61, and the outputs E and H are added by the adder 62. The outputs (F+G) and (E+H) are subtracted by the subtracter 66. The output (F+G)−(E+H) is applied to a plus terminal of the subtracter 70.

On the other hand, the outputs B and C of the photodetector 54 are added by the adder 59, and the outputs A and D are added by the adder 60. The outputs (B+C) and (A+D) are subtracted by the subtracter 65. The output (B+C)−(A+D) is applied to one of the terminals of the adder 67. Furthermore, outputs I and J of the photodetector 56 are added by the adder 63. The output (I+J) is applied to the other terminal of the adder 67. The output {(B+C)−(A+D)}+{(I+J)} of the adder 67 is applied to the coefficient multiplier 77 where the {(B+C)−(A+D)}+{(I+J)} is multiplied by a constant K (K=0–1) for correction. The multiplied output K[{(B+C)−(A+D)}+{(I+J)}] is applied to a minus terminal of the subtracter 70. Thus, the tracking error signal {(F+G)−(E+H)}−{(A+D)}−K[{(B+C)−(A+D)}+{(I+J)}] is produced from a terminal 73.

In the embodiment, if the constant K is properly adjusted, noise signal caused by the prepit 4 on the land 3 included in the original tracking error signal (F+G)−(E+H) is reduced.

FIGS. 9a and 9b show a third embodiment of the reading system. The system is provided for reducing influence of the information written on the groove with the prepit signal as much as possible, thereby obtaining the prepit signal with a good C/N.

A photodetector 80 has four photodetecting elements A, B, C and D as shown in FIG. 9b. If only the prepit signal is read, a photodetector having two photodetecting elements may be used.

The system further has a waveform shaping circuit 82 for producing a noise cancel signal for canceling noises which are dependent on information written in the groove, and subtracters 81 and 83.

Describing the operation, the photodetector 80 applies added outputs (A+B) and (C+D) to the subtracter 81 which produces the prepit signal (A+B)–(C+D). In the prepit signal (A+B)–(C+D), noises caused by the information written on the groove 2 are included. The prepit signal (A+B)–(C+D) is applied to the subtracter 83.

The photodetector 80 further applies the output (A+B+C+D) to the waveform shaping 82 where the noise cancel signal is produced in accordance with the (A+B+C+D). The noise cancel signal is applied to the subtracter 83 where the noise cancel signal is subtracted from the prepit signal (A+B)–(C+D). Thus, the noises are canceled.

Figure 10:
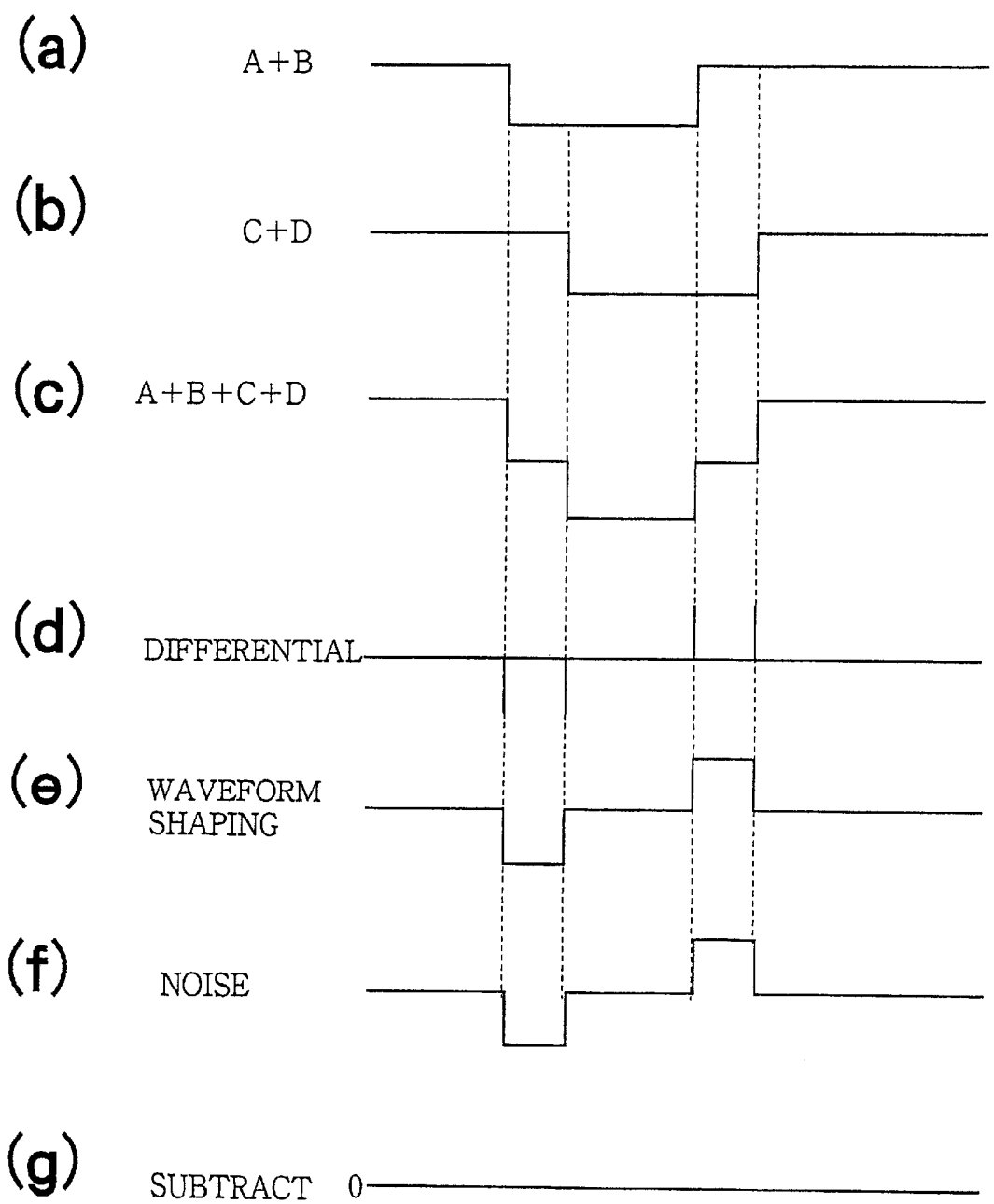
FIG. 10 is an explanatory diagram showing signals for producing a groove pit canceling signal of the third embodiment.

A method for producing the noise cancel signal in the waveform shaping circuit 82 will be described with reference to FIG. 10.

It is assumed that no prepit is recorded on the land of the disc and that the information is written on the groove. When the beam spot is tracking on the groove of the disc, the added outputs (A+B) and (C+D) are shown by the waveforms (a) and (b), respectively.

On the other hand, the prepit signal (push-pull signal) is obtained by the calculation (A+B)–(C+D). If the calculation is made, the waveform (f) is produced. The output is noise to be included in the prepit signal if prepits are recorded on the land. Accordingly, if the noises are canceled from the prepit signal, the influence with the prepit signal is removed.

In the embodiment, the output (RF signal) (A+B+C+D) shown by the waveform (c) is produced by the outputs (A+B) and (C+D) shown by the waveforms (a) and (b). The output (c) is differentiated to produce a differential signal (d). Based on differential signal (d), the noise cancel signal having the waveform (e) is produced.

It will be seen that the noise cancel signals (e) and the noise (f) have the same waveform. Thus, the noise cancel signal is subtracted from the prepit signal (A+B)–(C+D), which is obtained from the prepit on the land, by the subtracter 83 of FIG. 9a, so that the influence of the written information is removed from the prepit signal as shown by the waveform (g), thereby obtaining the prepit signal having a good C/N.

Figure 11:
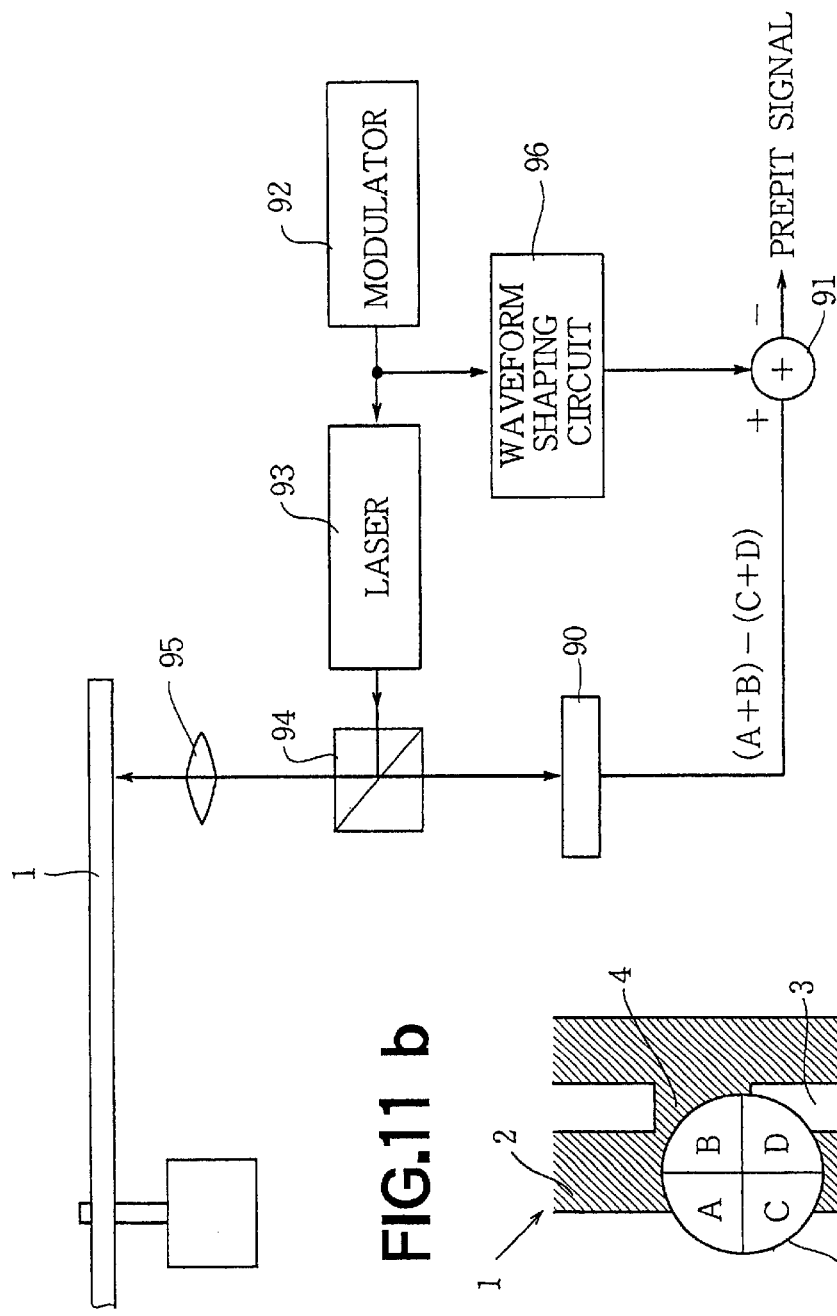
FIGS. 11a and 11b are diagrams showing a reading system of a fourth embodiment of the present invention.

FIGS. 11a and 11b show a fourth embodiment of the reading system in which the prepit information recorded on the land is exactly read out while information is written in the groove of the disc without interference of information signal to be written.

The reading system comprises a laser 93 for emitting the laser beam, a modulator 92 for modulating the laser beam, a prism 94, an objective lens 95, a photodetector 90, a subtracter 91, and a waveform shaping circuit 96.

The laser beam emitted from the laser 93 is projected on the disc 1 through the prism 94 and the objective lens 95. The reflected light is detected by the photodetector 90.

The photodetector 90 has four photodetecting elements A, B, C and D as shown in FIG. 11b.

Figure 12:
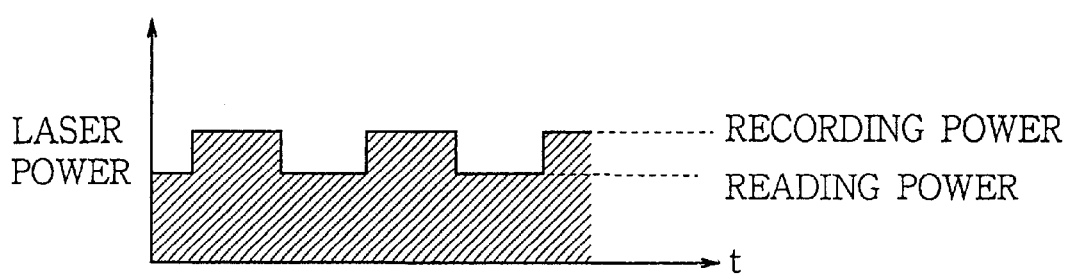
FIG. 12 is a diagram showing power of a laser beam.

FIG. 12 shows the power of the laser. When the information is read out, the laser power is controlled to be decreased, not to a zero level, so as to read the prepit information.

Describing the operation, the photodetector 90 applies added outputs (A+B) and (C+D) to the subtracter 91 which produces the prepit signal (A+B)–(C+D). In the signal (A+B)–(C+D), noises caused by the information signal to be written on the groove 2 are included.

The waveform shaping circuit 96 produces a noise cancel signal in accordance with the modulating signal for modulating the laser power of the laser 93 from the modulator 92. The noise cancel signal is subtracted from the prepit signal (A+B)–(C+D) by the subtracter 91. Thus, the noises are canceled.

Figure 13:
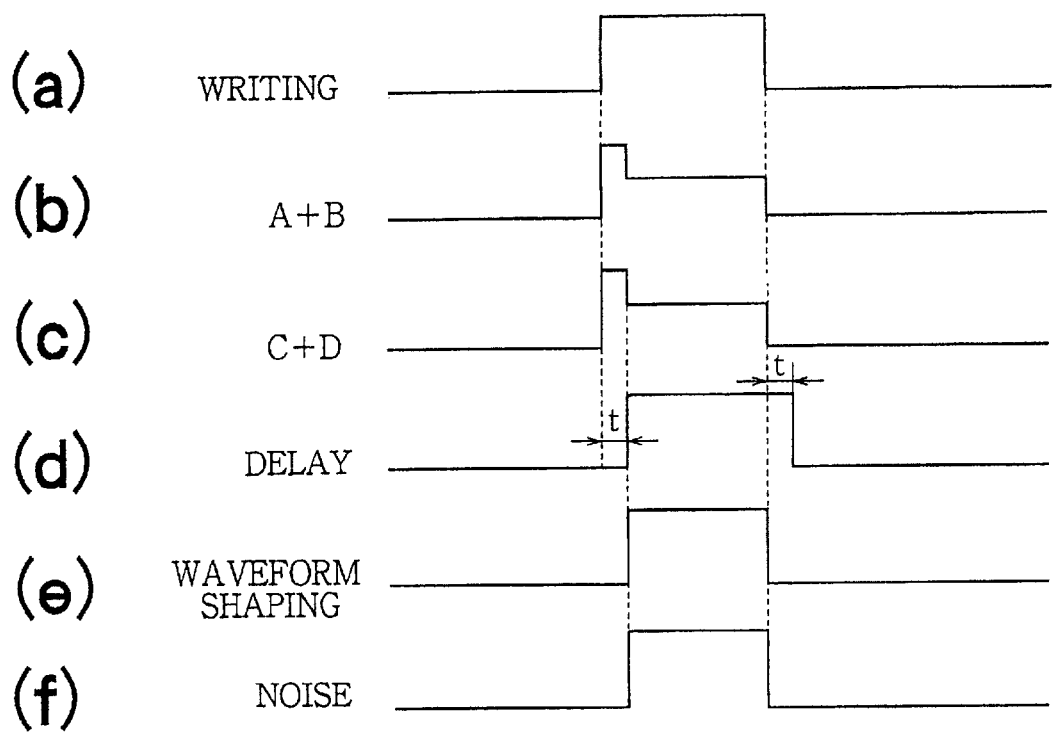
FIG. 13 is an explanatory diagram showing signals for producing a groove pit canceling signal of the fourth embodiment.

A method for producing the noise cancel signal in the waveform shaping circuit will be described with reference to FIG. 13.

It is assumed that no prepit is recorded on the land. The laser beam having a waveform (a) for writing information on the groove is reflected from the disc and received by the photodetector 90. The added outputs (A+B) and (C+D) of the photodetector 90 are shown by waveforms (b) and (c), respectively. In each of the waveforms (b) and (c), a pit written on the groove is represented at a position where the output is decreased stepwise.

On the other hand, if the prepit signal calculation (A+B)–(C+D) is made, a waveform (f) is produced. The output is noise to be included in a prepit signal produced by prepit information recorded on the land. Accordingly, if the noise is canceled, the influence on the prepit signal is removed.

In the embodiment, the writing light (a) is delayed by a time t to produce a delay signal having the waveform (d). The delay signal (d) is shortened by the time t at the rear end so that a noise cancel signal having the waveform (e) is produced.

It will be seen that the noise cancel signal (e) and the noise (f) have the same waveform. Thus, the noise cancel signal is subtracted from the prepit signal (A+B)–(C+D) obtained by recorded prepit information by the subtracter 91 of FIG. 11a, so that the influence of the noise is removed from the prepit signal, thereby obtaining a prepit signal having a good C/N.

In the embodiments, the push-pull signal (prepit signal) is formed by a pair of outputs disposed on the opposite sides in the tracking direction. Alternatively, the push-pull signal may be formed by a pair of outputs of photodetectors disposed on opposite sides of the track direction. In such a push-pull signal, tracking error signal and prepit signal are included. The tracking error signal is included in the push-pull signal as a low frequency component. The low frequency band of the tracking error signal is easily separated by using a filter.

It is possible to determine a left prepit or a right prepit of the groove by a polarity.

The embodiment of the present invention can be variously modified.

In accordance with the present invention, the prepit information including address information is recorded on the land as the guiding track. Thus, the capacity for writing the information is increased, thereby improving the available efficiency of the disc.

The prepit information is recorded on every other land. Thus, the prepits on the adjacent lands opposite to the groove are not interfered from each other. Thus, the prepit information with a good C/N can be obtained.

The groove is used as the information writing track, and the land is used as the guiding track. Consequently, the recorded information and the prepit information can be ensurely and separately read out.

The prepit information for guiding track is derived based on the difference signal between the outputs produced from the two-divided photodetector. The prepit information is ensurely obtained with a simple structure.

The prepit signal and the tracking signal are obtained by the single photodetector. Thus, the system is reduced in size.

The prepit information for guiding track is derived based on the difference signal between the outputs produced from the two-divided photodetector divided in the track direction. The tracking signal is produced by the difference signal at a low frequency area.

In the three spot method, the prepit information and the tracking information are obtained by two photodetectors. Thus, the C/N is further improved.

In the disc having the written information, the noise cancel signal is produced for canceling noises caused by the written information. Thus, the prepit signal having a good C/N is obtained.

Furthermore, the noise cancel signal is produced by the modulating signal for modulating the laser beam. Thus, the prepit signal having a good C/N is obtained.

In the manufacturing method of the disc, since the original substrate is cut by one cutting process, the prepit on the land is not deflected, thereby manufacturing the disc of a high quality.

While the invention has been described in conjunction with preferred specific embodiment thereof, it will be understood that this description is intended to illustrate and not limit the scope of the invention, which is defined by the following claims.

What is claimed is:

1. A reading system for reading a writable optical disc having an information writing track, and a guiding track for introducing a laser beam to the information writing track, and prepit information including address information recorded on the guiding track, the system comprising:
   a photodetector having photodetecting elements divided at least by a dividing line optically parallel with a radial direction of the disc for detecting reflected light of a laser beam irradiated to the information writing track,
   difference signal producing means for producing a difference signal based on a difference between outputs of the divided photodetecting elements,
   addition signal producing means for producing an addition signal based on an addition between outputs of the divided photodetecting elements,
   noise cancel signal producing means for producing a noise cancel signal which cancels noise component of the difference signal occurring by information recorded on the information writing track based on the addition signal, and
   prepit signal producing means for producing a prepit signal based on subtracting the noise cancel signal from the difference.

2. The reading system according to claim 1, wherein
   the noise cancel signal producing means differentiates the addition signal to obtain a differential signal, and
   the noise cancel signal is produced based on the differential signal.

3. A reading system for reading a writable optical disc having an information writing track, and a guiding track for introducing a laser beam to the information writing track, and prepit information including address information recorded on the guiding track, the system comprising:
   a photodetector having photodetecting elements divided at least by a dividing line optically parallel with a radial direction of the disc for detecting reflected light of a laser beam irradiated to the information writing track,
   a first subtractor for producing a difference signal based on a difference between outputs of the divided photodetecting elements,
   an adder for producing an addition signal based on an addition between outputs of the divided photodetecting elements, a wave form shaping circuit for producing a noise cancel signal which cancels noise component of the difference signal occurring by information recorded on the information writing track based on the addition signal, and
   a second subtractor for producing a prepit signal based on subtracting the noise cancel signal from the difference.

4. The reading system according to claim 3, wherein
   the wave form shaping circuit differentiates the addition signal to obtain a differential signal, and
   the noise cancel signal is produced based on the differential signal.

* * * * *